United States Patent [19]
Nishimura et al.

[11] Patent Number: 5,276,383
[45] Date of Patent: Jan. 4, 1994

[54] ROUTE INTERPOLATION METHOD FOR ROBOT

[75] Inventors: Toshihiko Nishimura, Kobe; Masahiko Yomota, Nishinomiya, both of Japan

[73] Assignee: Kabushiki Kaisha Kobe Seiko Sho, Kobe, Japan

[21] Appl. No.: 750,397

[22] Filed: Aug. 27, 1991

[30] Foreign Application Priority Data

Aug. 30, 1990 [JP] Japan .................. 2-230035

[51] Int. Cl.$^5$ .............. G05B 19/41; G05B 19/18
[52] U.S. Cl. ................... 318/568.15; 318/571; 318/578; 318/569; 364/167.01; 364/474.29; 364/474.30
[58] Field of Search ............ 318/560-630; 364/474.25-474.35

[56] References Cited

U.S. PATENT DOCUMENTS

| | | | |
|---|---|---|---|
| 4,529,921 | 7/1985 | Moribe | 318/567 X |
| 4,541,060 | 9/1985 | Kogawa | 318/573 X |
| 4,543,625 | 9/1985 | Nozawa et al. | 318/573 X |
| 4,550,383 | 10/1985 | Sugimoto | 318/573 X |
| 4,594,671 | 6/1986 | Sugimoto et al. | 364/513 |
| 4,672,190 | 6/1987 | Rostkowski et al. | 318/577 X |
| 4,728,872 | 3/1988 | Kishi et al. | 318/567 X |
| 4,870,560 | 9/1989 | Seki et al. | 364/474.08 |
| 4,903,213 | 2/1990 | Buhler et al. | 318/573 X |
| 4,914,599 | 4/1990 | Seki et al. | 364/474.08 |
| 4,942,350 | 7/1990 | Seki et al. | 318/569 |
| 5,025,362 | 6/1991 | Darlington | 364/474.29 X |

FOREIGN PATENT DOCUMENTS 127443  5/1989  Japan .

*Primary Examiner*—Paul Ip
*Attorney, Agent, or Firm*—Oblon, Spivak, McClelland, Maier & Neustadt

[57] ABSTRACT

A robot route interpolation method for interpolation a polygonal route of a robot which is defined by the predetermined three or more points, wherein the acceleration at the time when a first velocity on the above polygonal route before a turning point is changed into a second velocity on the above polygonal route after the turning point is obtained based on the above first and second velocities so that, based on the above first velocity and the above acceleration, the above robot is moved toward the turning point at an uniform velocity of the first velocity and is also moved at an uniform acceleration in the direction of the above acceleration.

16 Claims, 2 Drawing Sheets

ROUTE INTERPOLATION METHOD FOR ROBOT

BACKGROUND OF THE INVENTION

(1) Field of the Invention

The present invention relates to a robot route interpolation method for interpolating a polygonal route of a robot which is defined by the predetermined three or more points.

(2) Description of the Prior Art

As shown in FIG. 3, when a robot hand (not shown) is moved along a polygonal route 1 which is defined by the predetermined three points A, B and C, the route becomes discontinuous at the turning point B and therefore, a velocity change or an acceleration also becomes discontinuous.

As a result, there is arisen such a drawback as exerting a greater shock on the above robot hand.

Accordingly, in order to solve the above drawback, there has been proposed a route interpolation method in which the above polygonal route 1 is interpolated by a curve line so as not to pass the above turning point B.

For example, in the technical teaching disclosed in Japanese Patent Publication No. hei 1-27443, an interpolation is carried out in the following manners. First, along a route of a straight line before a turning point, the robot hand is moved toward a turning point at a velocity which is monotonously reduced and becomes zero at the turning point. Next, along a route of a straight line after the turning point, the robot hand is moved at a velocity which is monotonously increased from zero to the predetermined velocity. Then, there is added an increment from the above turning point to the position determined by the above velocity increasing interpolation, on the position determined by the above velocity reducing interpolation, to thereby form the route.

However, in the above prior art, the route interpolation is carried out by adding vectors which are changed in uniformly reduced velocity or uniform acceleration, so that the acceleration becomes larger as an angle formed between two adjacent lines of the polygonal route (refer to FIG. 3) becomes small, thus exerting a greater shock on the robot hand.

SUMMARY OF THE INVENTION

It is therefore an object of the present invention to provide a robot route interpolation method capable of moving the robot smoothly along the route without exerting any shock on the robot even in the case of the route interpolation for any type of polygonal route.

In order to accomplish the above object, there is provided a method for interpolating the polygonal route of a robot which is defined by the determined three or more points, wherein an acceleration at the time when a first velocity on the above polygonal route before a turning point is changed into a second velocity on the above polygonal route after the turning point is obtained based on the above first and second velocities so that, based on the above first velocity and the above acceleration, the above robot is moved toward the above turning point at an uniform velocity of the first velocity and is also moved at an uniform acceleration in the direction of the above acceleration.

In the route interpolation method in accordance with the present invention, as shown in FIG. 1, there is formed an interpolation route having substantially an asymptotic parabolic configuration to a turning point B according to an angle $\theta$ formed between two adjacent lines of the polygonal route. Therefore, not only on transition points between the polygonal route and the interpolation route but also even on a pinnacle of the interpolation route in the case that the angle $\theta$ becomes small, an abrupt velocity change is not caused, thus preventing such a drawback as exerting a greater shock on the robot.

Moreover, in the case that the angle $\theta$ becomes zero (refer to FIG. 2 (a)), it is understood that the movement of the robot hand becomes equivalent to the simply accelerated/decelerated movement with respect to the turning point on a straight line, and thus the abrupt velocity change does not arise.

PREFERRED EMBODIMENTS

Hereinafter an exemplary embodiment of a route interpolation method of a robot in accordance with the present invention will be now explained with reference to the accompanying drawings.

Figure 1:
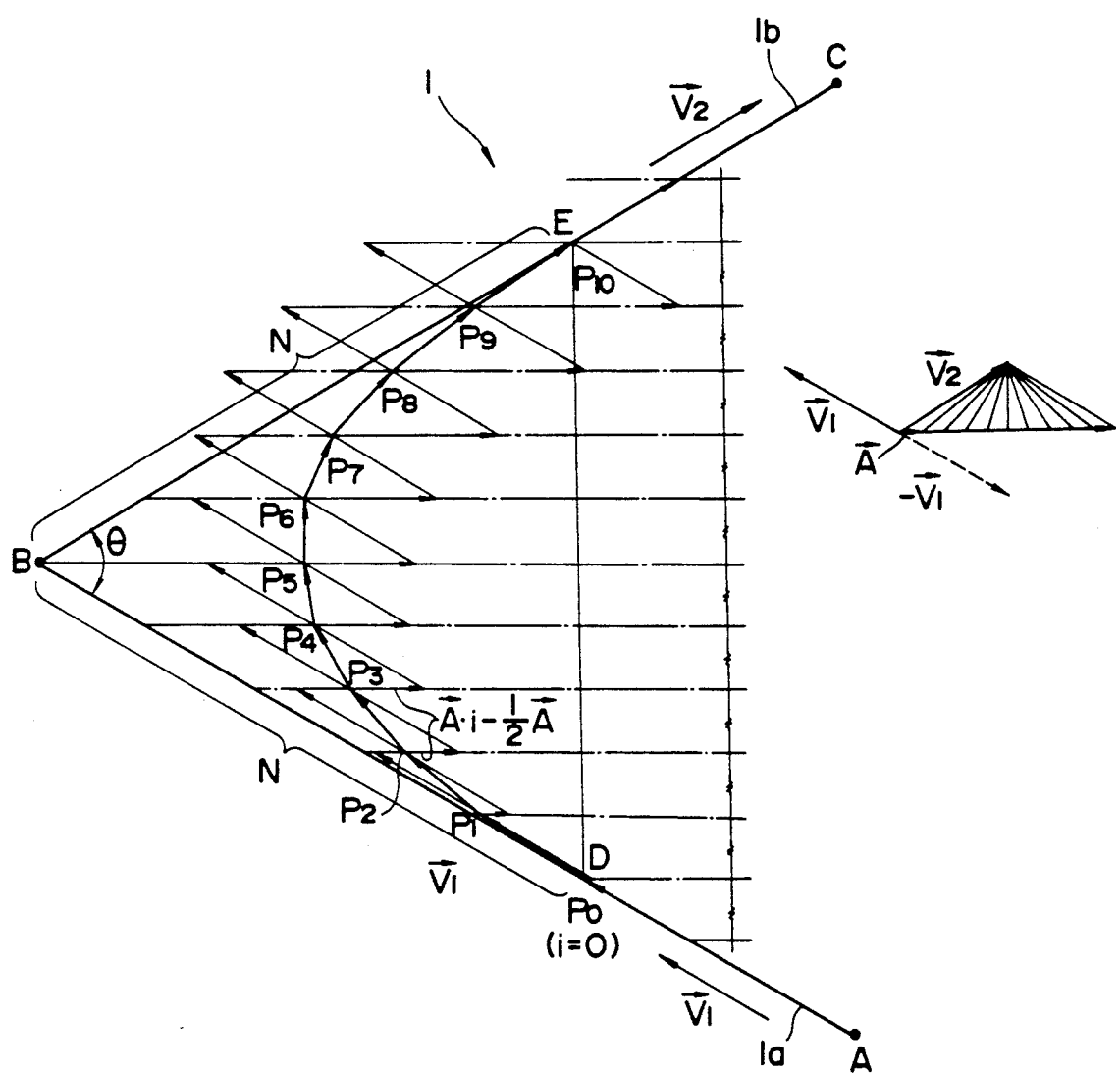
FIG. 1 is an illustrative view of an interpolation route formed by using a route interpolation method in accordance with one embodiment of the present invention.

As shown in FIG. 1, when a robot hand (not shown) is moved on a polygonal route 1 defined by the predetermined three points A, B and C, from the point A to the point C, there are set both a first velocity $\vec{V_1}$ (a shift vector for one unit control cycle) on a route $1a$ of the above polygonal route 1 before a turning point B and a second velocity $\vec{V_2}$ (a shift vector for one unit control cycle) on a route $1b$ of the above polygonal route 1 after the turning point B. Next, in order to form an interpolation route extending from a point D ($P_0$) on the above route $1a$ to a point E ($P_{10}$) on the above route $1b$, division numbers N for dividing a region from the point D to the point B and a region from the point B to the point E are set. (N is set at 5 in each region, in this embodiment).

Further, at the position corresponding to each point divided by the above number N, a front end position $\vec{P_i}$ ($X_{pi}$, $Y_{pi}$, $Z_{pi}$) of the above robot hand is successively calculated based on a following formula (1) so that a parabolic path which is asymptotic to the turning point B can be obtained.

$$\vec{P_i} = \vec{P_{i-1}} + \vec{V_1} + \vec{A} \cdot i - \tfrac{1}{2}\vec{A} \qquad (1)$$

wherein, the value (i) represents a number corresponding to any one of 0 to 2·N (2·N = 10 in this embodiment), and the value $\vec{A}$ represents an acceleration vector.

Then, the above acceleration vector is expressed as follows.

$$\vec{A} = (\vec{V_2} - \vec{V_1})/2 \cdot N \qquad (2)$$

Successively, processing steps of the route interpolation method in accordance with this embodiment will be hereinafter explained in detail.

When the robot hand reaches the point D, the following processing are carried out.

(1) It is supposed that the value (i) equals 0 and a position vector at the point D is $P_0$, the acceleration vector $\vec{A}$ is calculated in accordance with the following equation.

$$\vec{A} = (\vec{V_2} - \vec{V_1})/10 \tag{3}$$

(2) It is supposed that the value (i) equals (i+1), the following equations are calculated.

$$\Delta \vec{V_i} = \vec{V_1} + \vec{A} \cdot i - \tfrac{1}{2}\vec{A} \tag{4}$$

$$\vec{P_{i+1}} = \vec{P_i} + \Delta \vec{V_i} \tag{5}$$

(3) $\vec{P_{i+1}}$ is inverted to obtain each joint angle $\vec{\theta_i}$, and then each element is servo-controlled based on the value of $\vec{\theta_i}$.

The processing described in the equations (4) and (5) is carried out repeatedly at each interval of a control cycle. If the value (i) equals to 10 at the timing of the processing of the equation (5), the robot hand reaches the point E and then is moved toward the point C at an uniform velocity on a straight line.

That is, in accordance with the present invention, an acceleration at the time when the robot is moved from the first velocity $\vec{V_1}$ to the second velocity $\vec{V_2}$ is obtained, and based on the above first velocity $\vec{V_1}$ and the above acceleration, the route interpolation is performed in such a manner that the robot hand is moved toward the turning point B at an uniform velocity of the first velocity $\vec{V_1}$ and is also moved at an uniform acceleration in the direction of the above acceleration. Therefore, there is formed a parabolic interpolation route which is asymptotic to the turning point B in accordance with the amount of the joint angle $\theta$ of the polygonal route 1.

Furthermore, not only on transition points (the points D and E) between the polygonal route 1 and the interpolation route but also even on a pinnacle of the interpolation route in the case that the angle $\theta$ becomes small, an abrupt velocity change is not caused, thus preventing such a drawback as exerting a greater shock on the robot.

Figure 2A:
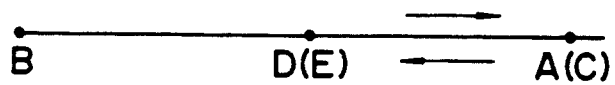
FIGS. 2 (a) and 2 (b) are views showing another example of the above route interpolation method in accordance with the present invention, in which FIG. 2 (a) is an illustrative view of a route
FIG. 2(b) is a graph showing velocity changes when a robot is moved along the route.
Figure 2B:
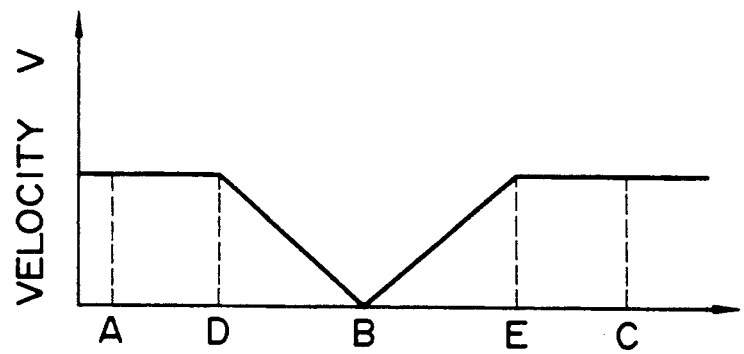
Figure 3:
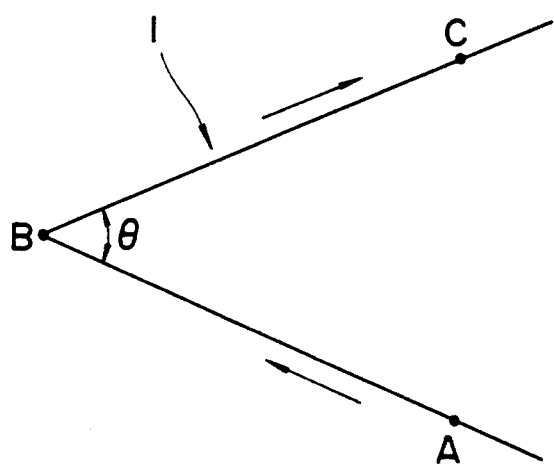
FIG. 3 is view of a polygonal route for illustrating a background of the present invention.

Moreover, in accordance with the present invention, in the case that the angle $\theta$ becomes zero (refer to FIG. 2(a)), it is understood that the robot is moved in such a way as to be simply accelerated or decelerated on a straight line to the turning point B, so that the abrupt velocity change does not arise (refer to FIG. 2 (b)).

Even in the case that either of the following well-known variables is used as the position variable $\vec{P_i}$ or the velocity $\vec{V_i}$, it is possible to obtain the similar effect as the route interpolation method of this embodiment.

(1) Tool position coordinates X, Y, Z and tool position vectors $\vec{O}, \vec{N}, \vec{A}$.

(2) Tool position coordinates X, Y, Z and tool position Eulerian angles $\alpha, \beta, \gamma$.

(3) Tool position coordinates X, Y, Z and wrist joint angles $\theta_4, \theta_5, \theta_6$.

(4) Arm joint angles $\theta_1, \theta_2, \theta_3$ and wrist joint angles $\theta_4, \theta_5, \theta_6$.

Furthermore, in the route interpolation method in accordance with the present invention, the variables are not limited in the above described six variables, but expanded to n-variables ($n \geq 1$).

Still further, in this method, the joint velocity $\vec{\theta_i}$ can be directly obtained from the velocity vector $\Delta \vec{V_i}$ by using the Jacobian matrix J.

As mentioned above, the present invention relates to a route interpolation method for interpolation a polygonal route of a robot which is defined by the predetermined three or more points, wherein an acceleration at the time when a first velocity on the above polygonal route before a turning point is changed into a second velocity on the above polygonal route after the turning point is obtained based on the above first and second velocities so that, based on the above first velocity and the above acceleration, the above robot is moved toward the turning point at an uniform velocity of the first velocity and is also moved at an uniform acceleration in the direction of the above acceleration. Therefore, even in the case of performing the route interpolation for any type of the polygonal route, it is possible to move the robot smoothly on the route without exerting any shock on the robot.

The present invention has been described in detail with particular reference to preferred embodiments thereof but it will be understood that variations and modification can be effected within the spirit and scope of the invention.

What is claimed is:

1. In a robot route interpolation method for interpolating a polygonal route of a robot which is defined by a corresponding predetermined three or more points, said method comprising the steps of:

obtaining an acceleration based upon a first velocity on said polygonal route before a turning point and a second velocity on said polygonal route after said turning point; and moving said robot toward said turning point at a uniform velocity of said first velocity while moving said robot at a uniform acceleration comprised of a product of said acceleration and a positional coefficient in the direction of said acceleration.

2. A method as recited in claim 1, further comprising:

dividing a first segment of said polygonal route between a first and a second of said predetermined points into a predetermined number of sections, and dividing a second segment of said polygonal route between said second and a third of said predetermined points into said predetermined number of sections;

determining a position vector corresponding to each of said sections of each of said first and second segments, each of said position vectors being asymptotic to said turning point;

wherein each of said position vectors are determined based upon said first velocity and said acceleration.

3. A method as recited in claim 2, wherein said step of determining said position vectors comprises:

determining a first position vector at a selected section;

determining a change in velocity vector for each of said sections; and determining a position vector for a section i using a position vector and a change in velocity vector corresponding to a section i−1.

4. A method as recited in claim 3, further comprising:

inverting each of said position vectors to obtain corresponding joint angle vectors and servo controlling said robot based upon said joint angle vectors.

5. A method as recited in claim 3, comprising:

determining a first position vector $\vec{P}$;

determining a change in velocity vector $\Delta\vec{V}_i$ for each of said sections i as $$\Delta\vec{V}_i = \vec{V}_1 + \vec{A}\cdot i - \tfrac{1}{2}\vec{A};$$

and determining a position vector for a section i as:

$$\vec{P}_{i+1} = \vec{P}_i + \Delta\vec{V}_i$$

where:
$\vec{V}_1$ is a vector representing said first velocity, and
$\vec{A}$ is a vector representing said acceleration.

6. A method as recited in claim 1, further comprising:
dividing a first segment of said polygonal route between a first and a second of said predetermined points into a predetermined number of sections, and dividing a second segment of said polygonal route between said second and a third of said predetermined points into said predetermined numbers of sections; and
obtaining said acceleration as a vector $\vec{A}$ as:

$$A = (V_2 - V_1)/2N$$

where:
$V_1$ is a vector representing said first velocity,
$V_2$ is a vector representing said second velocity, said
N is said predetermined number of sections.

7. A method as recited in claim 1, further comprising:
dividing a first segment of said polygonal route between a first and a second of said predetermined points into a predetermined number of sections, and dividing a second segment of said polygonal route between said second and a third of said predetermined points into said predetermined number of sections; and
determining a plurality of positional coefficients as a first positional coefficient and twice said predetermined number of second positional coefficients determined by incrementing said first positional coefficient.

8. A method as recited in claim 7, further comprising:
determining an interpolation route between a first segment point on said first segment and a second segment point on said second segment;
determining said first positional coefficient at said first segment point;
determining said second positional coefficients at points on said interpolation route corresponding to said predetermined number of sections of said first and second segments; and
determining a last of said second coefficients at said second segment point.

9. A robot route interpolation method for interpolating a polygonal route of a robot which is defined by a corresponding predetermined three or more points, said method comprising the steps of:
obtaining an acceleration vector based upon a vector difference between a second velocity vector on said polygonal route after a turning point and a first velocity vector on said polygonal route before said turning point; and
moving said robot toward said turning point at said first velocity vector while uniformly accelerating said robot using a product of said acceleration vector and a positional coefficient.

10. A method as recited in claim 9, further comprising:
dividing a first segment of said polygonal route between a first and a second of said predetermined points into a predetermined number of sections, and dividing a second segment of said polygonal route between said second and a third of said predetermined points into said predetermined number of sections;
obtaining said acceleration vector $\vec{A}$ as:

$$A = (V_2 - V_1)/2N$$

where:
$V_1$ is said first velocity vector,
$V_2$ is said second velocity vector, and
N is said predetermined number of sections.

11. A method as recited in claim 9, further comprising:
dividing a first segment of said polygonal route between a first and a second of said predetermined points into a predetermined number of sections, and dividing a second segment of said polygonal route between said second and a third of said predetermined points into said predetermined number of sections;
determining a position vector corresponding to each of said sections of each of said first and second segments, each of said position vectors being asymptotic to said turning point;
wherein each of said position vectors are determined based upon said first velocity vector and said acceleration vector.

12. A method as recited in claim 11, wherein said step of determining said position vectors comprises:
determining a first position vector at a selected section;
determining a change in velocity for each of said sections; and
determining a position vector for a section i using a position vector and a change in velocity vector corresponding to a section i−1.

13. A method as recited in claim 12, further comprising:
inverting each of said position vectors to obtain corresponding joint angle vectors and servo controlling said robot based upon said joint angle vectors.

14. A method as recited in claim 12, comprising:
determining a first position vector $\vec{P}$;
determining a change in velocity vector $\Delta V_1$ for each of said sections i as:

$$\Delta\vec{V}_i = \vec{V}_1 + \vec{A}\cdot i - \tfrac{1}{2}\vec{A};$$

determining a position vector for a section i as:

$$\vec{P}_{i+1} = \vec{P}_i + \Delta\vec{V}_i$$

where:
$V_1$ is said first velocity vector, and
$\vec{A}$ is said acceleration vector.

15. A method as recited in claim 9, further comprising:
dividing a first segment of said polygonal route between a first and a second of said predetermined points into a predetermined number of sections, and dividing a second segment of said polygonal route between said second and a third of said predetermined points into said predetermined number of sections; and determining a plurality of positional coefficients as a first positional coefficient and twice said predetermined number of second positional coefficients determined by incrementing said first positional coefficient.

16. A method as recited in claim 15, further comprising:

determining an interpolation route between a first segment point on said first segment and a second segment point on said second segment;

determining said first positional coefficient at said first segment point;

determining said second positional coefficients at points on said interpolation route corresponding to said predetermined number of sections of said first and second segments; and determining a last of said second coefficients at said second segment point.

* * * * *